United States Patent
Ohta

(10) Patent No.: US 7,559,206 B2
(45) Date of Patent: Jul. 14, 2009

(54) SUPERCRITICAL HEAT PUMP CYCLE SYSTEM

(75) Inventor: Hiromi Ohta, Okazaki (JP)

(73) Assignee: Denso Corporation, Kariya (JP)

( * ) Notice: Subject to any disclaimer, the term of this patent is extended or adjusted under 35 U.S.C. 154(b) by 381 days.

(21) Appl. No.: 11/157,053

(22) Filed: Jun. 20, 2005

(65) Prior Publication Data

US 2005/0284164 A1     Dec. 29, 2005

(30) Foreign Application Priority Data

Jun. 23, 2004   (JP)   ............... 2004-185312

(51) Int. Cl.
  *F25B 13/00*   (2006.01)
  *F25B 41/00*   (2006.01)
  *F25B 49/00*   (2006.01)

(52) U.S. Cl. .............. 62/160; 62/222; 62/223; 62/228.4

(58) Field of Classification Search ............. 62/160, 62/222, 223, 224, 228.1, 228.3, 228.4
See application file for complete search history.

(56) References Cited

U.S. PATENT DOCUMENTS

| | | | |
|---|---|---|---|
| 4,364,237 A * | 12/1982 | Cooper et al. .................. | 62/160 |
| 5,890,370 A | 4/1999 | Sakakibara et al. | |
| 6,012,300 A | 1/2000 | Tomatsu et al. | |
| 6,230,506 B1 * | 5/2001 | Nishida et al. ................. | 62/223 |
| 6,505,476 B1 * | 1/2003 | Nishida et al. ............. | 62/228.5 |
| 2003/0168108 A1 | 9/2003 | Ise et al. | |
| 2005/0066675 A1 * | 3/2005 | Manole et al. ............. | 62/228.3 |
| 2005/0132731 A1 * | 6/2005 | Nakamura et al. ............. | 62/160 |

FOREIGN PATENT DOCUMENTS

| | | |
|---|---|---|
| JP | 2004-218858 | 8/2004 |
| WO | WO 93/06423 | 4/1993 |

* cited by examiner

*Primary Examiner*—Marc E Norman
(74) *Attorney, Agent, or Firm*—Harness, Dickey & Pierce, PLC

(57) ABSTRACT

A supercritical heat pump cycle system includes a low-pressure determining unit for determining a pressure of a low-pressure refrigerant after being decompressed in a decompression unit, a target temperature setting unit for setting a target temperature of the fluid, and a target pressure determining unit for determining a heating target control pressure in a refrigerant radiator based on the pressure of the low-pressure refrigerant and the target temperature of the fluid during the heating operation. In the supercritical heat pump cycle system, the decompression unit is controlled so that a refrigerant pressure in the refrigerant radiator becomes the heating target control pressure. Accordingly, heating capacity of the refrigerant radiator can be effectively increased.

18 Claims, 5 Drawing Sheets

SUPERCRITICAL HEAT PUMP CYCLE SYSTEM

CROSS REFERENCE TO RELATED APPLICATION

This application is based on Japanese Patent Application No. 2004-185312 filed on Jun. 23, 2004, the contents of which are incorporated herein by reference in its entirety.

FIELD OF THE INVENTION

The present invention relates to a supercritical heat pump cycle system having a heating operation for heating a fluid (e.g., air) by using a refrigerant radiator in which an inner pressure is higher than the critical pressure of refrigerant. More particularly, the present invention relates to a control of a decompression device in the heating operation.

BACKGROUND OF THE INVENTION

In a supercritical heat pump cycle system described in WO 93/06423 (JP-B2-2931668), a refrigerant temperature at a refrigerant outlet of a refrigerant radiator is detected. Furthermore, an open degree of a decompression device is controlled based on the refrigerant temperature to control the pressure of high-pressure refrigerant, so that coefficient of performance (COP) of the refrigerant cycle becomes in maximum.

Generally, in a heating operation for heating air (fluid) using a refrigerant radiator, an air temperature heated by the refrigerant radiator, a temperature variation in air flowing from the refrigerant radiator, and an air temperature distribution are greatly affected to a comfortable performance of the heating. Furthermore, the refrigerant temperature at the outlet of the refrigerant radiator is greatly changed based on an air amount flowing in the refrigerant radiator, an air temperature drawn into the refrigerant radiator and a rotational speed of the compressor. Therefore, in the heating operation, the temperature of air flowing out of the refrigerant radiator is also greatly changed.

The refrigerant amount flowing to the refrigerant radiator can be controlled using a variable displacement compressor. However, when the temperature of suction air is low (e.g., 0° C.) in the heating operation, it is difficult to stably control the capacity of the variable displacement compressor. For example, when the refrigerant amount discharged from the compressor is controlled to be smaller by using the variable displacement compressor, the high-pressure refrigerant pressure decreases. In this case, if the open degree of the decompression device is controlled to be smaller in order to maintain the high-pressure refrigerant pressure, the refrigerant circulating amount is changed and the refrigerant discharge capacity is also changed. Accordingly, the high-pressure refrigerant pressure or the refrigerant discharge capacity of the compressor cannot be stably controlled.

SUMMARY OF THE INVENTION

In view of the above-described problems, it is an object of the present invention to provide a supercritical heat pump cycle system which stably performs a heating operation using a refrigerant radiator.

It is another object of the present invention to provide a supercritical heat pump cycle system which stably performs a heating operation using a refrigerant radiator while restricting a variation in a fluid temperature heated by the refrigerant radiator.

It is further another object of the present invention to provide a supercritical heat pump cycle system which effectively increases a heating capacity of the refrigerant radiator.

According to an aspect of the present invention, a supercritical heat pump cycle system includes a compressor for compressing refrigerant, a refrigerant radiator having an inner pressure higher than a critical pressure of the refrigerant, a decompression unit which decompresses the refrigerant flowing from the refrigerant radiator, and a refrigerant evaporator for evaporating the refrigerant from the decompression unit. In the refrigerant radiator, the refrigerant discharged from the compressor is heat-exchanged with a fluid passing the refrigerant radiator to heat the fluid in a heating operation. In the cycle system, a low-pressure determining unit determines a pressure of a low-pressure refrigerant after being decompressed in the decompression unit, a target temperature setting unit sets a target temperature of the fluid, and a target pressure determining unit determines a heating target control pressure in the refrigerant radiator based on at least the target temperature of the fluid, or based on both the pressure of the low pressure refrigerant and the target temperature of the fluid, during the heating operation. Furthermore, the decompression unit is controlled so that a refrigerant pressure in the refrigerant radiator becomes the target control pressure.

Therefore, the temperature of the fluid heated by the refrigerant radiator is readily increased to the target temperature while the cycle system can be stably controlled. As an example, the fluid is air passing the refrigerant radiator.

Preferably, the target pressure determining unit includes memory means for memorizing a relationship between the pressure of the low-pressure refrigerant and a heating capacity for obtaining the target temperature of the fluid, and determines the heating target control pressure using the relationship.

The supercritical heat pump cycle system can be provided with a switching unit for switching between the heating operation and a cooling operation for cooling a fluid. In this case, the target pressure determining unit determines a cooling target control pressure where coefficient of performance (COP) becomes in maximum during the cooling operation, while the target pressure determining means determines the heating target control pressure based on the pressure of the low-pressure refrigerant and the target temperature of the fluid. Therefore, both of the cooling function in the cooling operation and heating function in the heating operation can be improved.

Alternatively, a super-critical refrigerant cycle system includes first calculation means for calculating a first target control pressure that is a pressure of the high-pressure refrigerant before being decompressed at which a temperature of the fluid heat-exchanged with the refrigerant in the refrigerant radiator approaches a target temperature, and second calculation means for calculating a second target control pressure that is a pressure of the high-pressure refrigerant before being decompressed by the decompression unit at which the refrigerant radiator has a maximum heating capacity in accordance with a pressure of low-pressure refrigerant after being decompressed by the decompression unit. In this case, an open degree of the decompression unit is controlled so that a refrigerant pressure in the refrigerant radiator becomes a smaller one between the first and second target control pressures. In this case, the temperature of the fluid can be rapidly heated and the heating capacity of the refrigerant radiator can be effectively increased while the cycle system can be stably operated.

For example, the calculating means calculates the target control pressure to have an upper limit at which the refrigerant radiator has a maximum heating capacity. Alternatively, the calculating means calculates the target control pressure to have an upper limit at which a refrigerant temperature of the compressor becomes lower than a permit discharge temperature of the compressor.

Furthermore, the discharge capacity of refrigerant discharged from the compressor can be controlled such that a temperature difference between a temperature of the fluid heat-exchanged in the refrigerant radiator and a refrigerant temperature at a refrigerant outlet of the refrigerant radiator approaches a target temperature difference.

Alternatively, the discharge capacity of refrigerant discharged from the compressor can be controlled such that a refrigerant temperature at the refrigerant outlet of the refrigerant radiator becomes a target refrigerant temperature at which coefficient of performance of the cycle system becomes in maximum relative to the inner pressure of the refrigerant radiator. Furthermore, the discharge capacity of refrigerant discharged from the compressor can be controlled such that a refrigerant temperature at a refrigerant outlet of the refrigerant radiator becomes a target refrigerant temperature that is set relative to the inner pressure of the refrigerant radiator. The discharge capacity of refrigerant discharged from the compressor is set at 100% when a flow amount of the refrigerant flowing in the refrigerant radiator is smaller than a value or when the outside air temperature is low. In this case, the pressure of the high-pressure refrigerant can be stably controlled even when the outside air temperature is low or the flow amount of the refrigerant flowing in the refrigerant radiator is small.

For example, the flow amount of the refrigerant flowing in the refrigerant radiator may be estimated based on a temperature of outside air and a rotation speed of the compressor.

BRIEF DESCRIPTION OF THE DRAWINGS

The above and other objects, features and advantages of the present invention will become more apparent from the following detailed description of exemplary embodiments made with reference to the accompanying drawings, in which.

DETAILED DESCRIPTION OF EXEMPLARY EMBODIMENTS

First Exemplary Embodiment

Figure 1A:
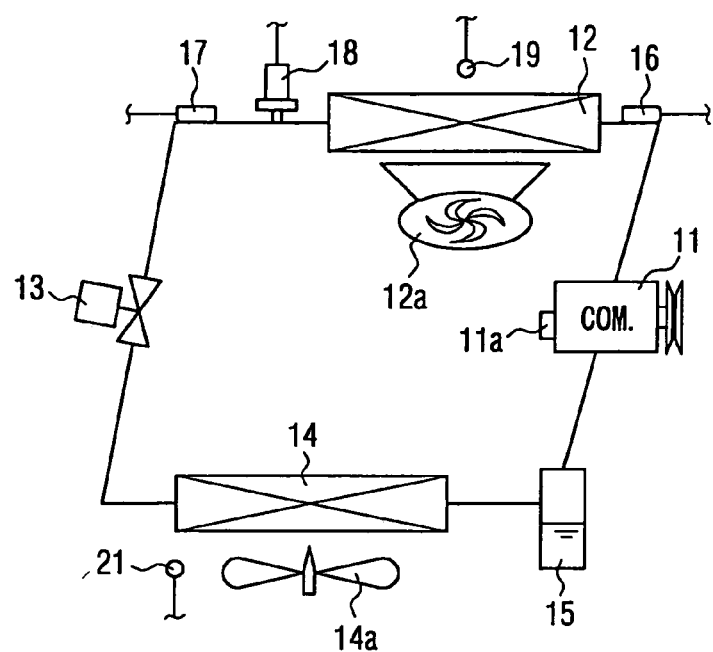
FIG. 1A is a schematic diagram showing a supercritical heat pump cycle system according to a first exemplary embodiment of the present invention.
Figure 1B:
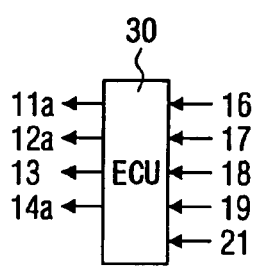
FIG. 1B is a block diagram showing a control device of the supercritical heat pump cycle system in FIG. 1A.

In this embodiment, a supercritical heat pump cycle system shown in FIGS. 1A and 1B is typically used for a vehicle air conditioner.

As shown in FIG. 1A, the supercritical heat pump cycle system includes a compressor 11 for compressing refrigerant, an interior heat exchanger 12 (interior gas cooler) used as a refrigerant radiator in a heating operation, an electrical expansion valve 13 used as a decompression unit, an exterior heat exchanger 14 used as a refrigerant evaporator in the heating operation, and an accumulator 15. Those components of the heat pump cycle system are connected to form a closed refrigerant cycle. As an example, carbon dioxide ($CO_2$) is used as refrigerant in the supercritical refrigerant cycle system.

The compressor 11 draws low-temperature and low-pressure gas refrigerant and compresses the drawn refrigerant to a supercritical state having a high temperature and a high pressure. The compressor 11 is driven by using a vehicle engine as a driving source, through a power transmitting unit composed of a pulley and a V-belt. The compressor 11 is connected to the driving source via a clutch.

A variable displacement mechanism 11a controls a capacity of a cylinder etc., in the compressor 11 from an exterior so as to change a refrigerant discharge capacity of the compressor 11. The variable displacement mechanism 11a is electrically connected to an air conditioning control device 30 (ECU) and is controlled by the air conditioning control device 30.

The interior heat exchanger 12 is a refrigerant radiator in a heating operation, for radiating a high-temperature and high-pressure refrigerant compressed in the compressor 11. In the heating operation, air blown by a blower 12a is heat-exchanged with the high-temperature refrigerant flowing in the interior heat exchanger 12, and is heated to be warm air. The interior heat exchanger 12 and the blower 12a are located in an air conditioning case having an air passage through which air flows into a passenger compartment. The air conditioning case is arranged in a dashboard mounted at a front portion in the passenger compartment. Further, in this embodiment, the inner pressure of the interior heat exchanger 12 is set at a pressure higher than the supercritical pressure of the refrigerant.

The electrical expansion valve 13 is a pressure control valve for decompressing refrigerant after being cooled in the interior heat exchanger 12. An open degree of the electrical expansion valve 13 is controlled so that the inner pressure of the interior heat exchanger 12 approaches a target control high pressure. Here, the target control high pressure may be calculated from a high pressure where the heating capacity of the interior heat exchanger 12 becomes in maximum. The electrical expansion valve 13 is electrically connected to the air conditioning control device 30 and is controlled by the air conditioning control device 30.

The exterior heat exchanger 14 is a refrigerant evaporator in the heating operation, in which gas-liquid two-phase refrigerant decompressed in the electrical expansion valve 13 is heat-exchanged with outside air blown by an exterior blower 14a and is evaporated. The accumulator 15 is a gas-liquid separator in which refrigerant evaporated in the exterior heat exchanger 14 is separated into liquid refrigerant and gas refrigerant. The accumulator 15 is connected to a suction side of the compressor 11 so that the gas refrigerant separated in the accumulator 15 is drawn to the compressor 11.

A refrigerant temperature sensor 16 is disposed at a discharge side of the compressor 11 to detect a refrigerant temperature (discharge refrigerant temperature) discharged from the compressor 11. Further, a refrigerant temperature sensor 17 is disposed at a refrigerant outlet side of the interior heat exchanger 12 to detect a refrigerant temperature (outlet refrigerant temperature) at an outlet of the interior heat exchanger 12. In addition, a pressure sensor 18 is disposed at a refrigerant outlet side of the interior heat exchanger 12 to detect the inner pressure of the interior heat exchanger 12. That is, the pressure sensor 18 detects the pressure of the high-pressure refrigerant before being decompressed in the electrical expansion valve 13.

An air temperature sensor 19 is disposed at a downstream air side of the interior heat exchanger 12 in the air conditioning case, to detect an air temperature after being heat-exchanged with the refrigerant in the interior heat exchanger 12. Further, an outside air temperature sensor 21 is disposed to detect temperature of outside air introduced to the exterior heat exchanger 14. Generally, the exterior heat exchanger 14 is located at a front portion of the vehicle, and the outside air temperature sensor 21 is located around a front grill at a front side of the exterior heat exchanger 14 in a vehicle.

Those sensors 16-19 and 21 are electrically connected to the air conditioning control device 30 to input sensor signals to the control device 30. In addition to the sensor signals from those sensors 16-19 and 21, sensor signals from other sensors such as an inside air temperature sensor and a solar radiation sensor are also input to the air conditioning control device 30. Furthermore, switch signals from an operation panel are also input to the air conditioning control device 30. The air conditioning control device 30 controls the variable displacement mechanism 11a, the electrical expansion valve 13 and the blowers 12a, 14a in accordance with a control program based on the sensor signals and the switch signals.

Figure 2:
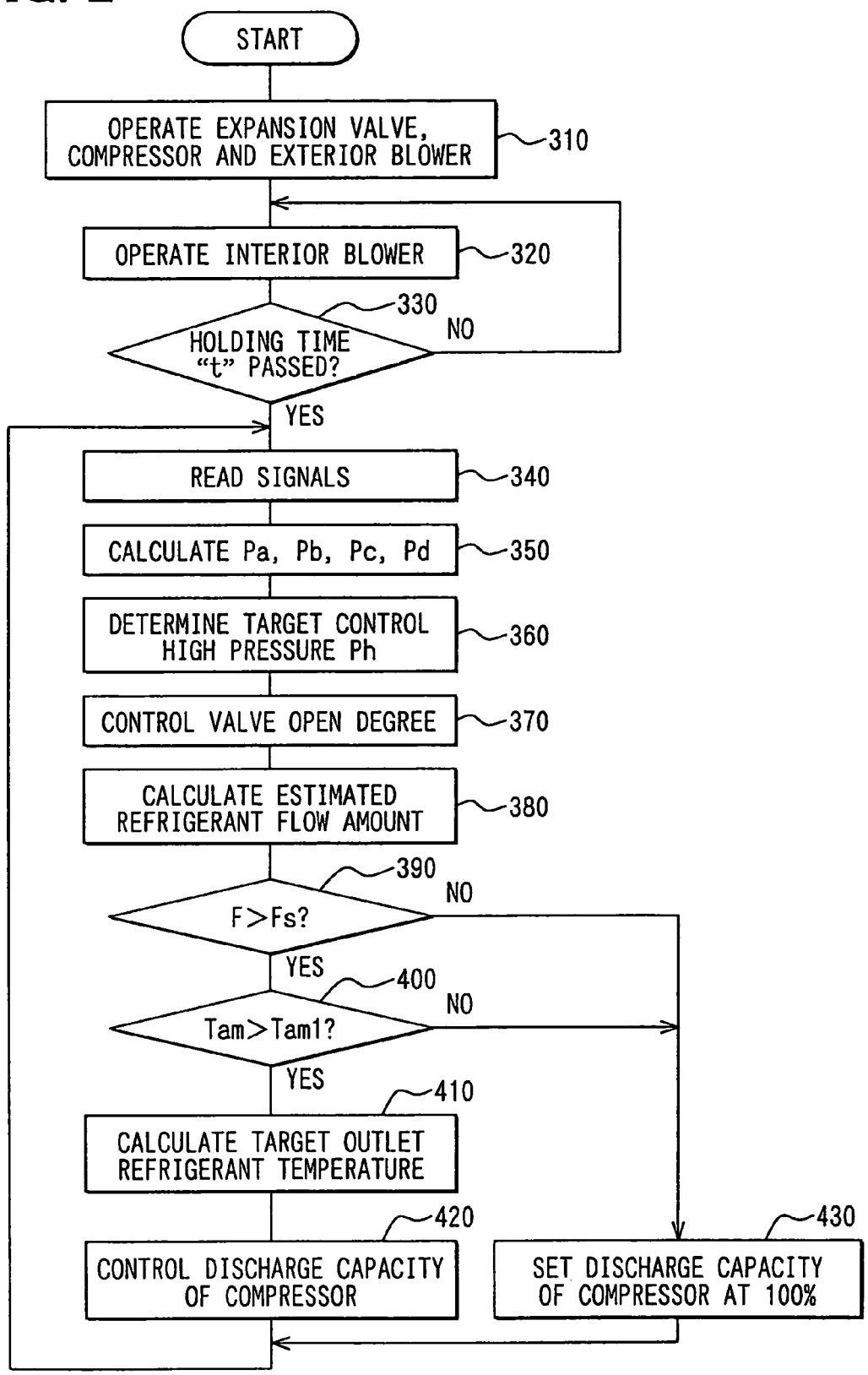
FIG. 2 is a flow diagram showing control process of an air conditioning control according to the first exemplary embodiment.

In this embodiment, the heating operation for heating air to be blown into the passenger compartment is performed using the interior heat exchanger 12. FIG. 2 shows a control process of the air conditioning control device 30 in the heating operation. When a switch of the heating operation is turned on, the control process shown in FIG. 2 starts.

First, at step 310, the electrical expansion valve 13 is opened by a predetermined start open degree, the clutch is operated to drive the compressor 11, and the exterior blower 14a is operated. At this time, a timer is started so that the electrical expansion valve 13 is opened by the start open degree for a time period. Therefore, high-temperature and high-pressure gas refrigerant discharged from the compressor 11 flows into the interior heat exchanger 12. At step 320, the operation of the interior blower 12a is started when the refrigerant temperature detected by the refrigerant temperature sensor 16 reaches a predetermined temperature. Then, the air blowing amount of the interior blower 12a is increased in accordance with a temperature increase of air heated by the interior heat exchanger 12. For example, the air blowing amount of the interior blower 12a may be increased gradually or stepwise in accordance with the temperature increase of the heated air by the interior heat exchanger 12. Air heated in the interior heat exchanger 12 is blown into the passenger compartment.

Next, at step 330, it is determined whether a holding time "t", for which the electrical expansion valve 13 is opened continuously by the predetermined start open degree, passes. However, at step 330, it may be determined whether a high-pressure refrigerant pressure detected by the refrigerant pressure sensor 18 or a refrigerant temperature detected by the discharged refrigerant temperature sensor 16 becomes higher than a predetermined value. In this case, when the refrigerant pressure detected by the refrigerant pressure sensor 18 or the refrigerant temperature detected by the discharged refrigerant temperature sensor 16 becomes higher than a predetermined value, the open degree of the electrical expansion valve 13 is controlled by an open degree in a normal heating control.

When the holding time "t" passes after the electrical expansion valve 13 is opened by the start open degree at step 310, the open degree of the electrical expansion valve 13 is controlled by an open degree in the normal heating control at step 340. In addition, at step 340, sensor signals from the sensors 16-19 and 21 etc., and switch signals such as a set temperature of air are read as input date.

Then, at step 350, target control high pressures Pa, Pb, Pc and Pd are calculated based on the input date. Next, at step 360, the smallest one among the target control high pressures Pa, Pb, Pc and Pd is determined as a final target control high pressure Ph. The open degree of the electrical expansion valve 13 is controlled at step S370 so that the high-pressure refrigerant pressure detected by the refrigerant pressure sensor 18 becomes the target control high pressure Ph.

At step 350, the smaller one of at least two among the target control high pressures Pa, Pb, Pc and Pd may be set as the final target control high pressure Ph. Further, one of the target control high pressure Pa, Pb can be set as the target control high pressure Ph. Furthermore, a smaller one between the target control high pressures Pa, Pb can be set as the target control high pressure Ph.

Here, the target control high pressures Pa, Pb, Pc and Pd will be described in detail. The target control high pressure Pa is a high-pressure refrigerant pressure where the air temperature detected by the air temperature sensor 19 becomes a target air temperature TAO blown from the interior heat exchanger 12. The target air temperature TAO is calculated by the air conditioning control device 30 based on an outside air temperature Tam, an inside air temperature, a solar radiation amount entering into the passenger compartment, and a set temperature of air heated by the interior heat exchanger 12. When the high-pressure refrigerant pressure is controlled in accordance with the target control high pressure Pa, an air temperature corresponding to the target air temperature TAO can be obtained, and comfortable heating can be obtained. In this embodiment, the air conditioning control device 30 can estimate the pressure of low-pressure refrigerant decompressed in the electrical expansion valve 13 based on the outside air temperature detected by the outside air temperature sensor 21. In this case, the air conditioning control device 30 determines the target control high pressure Pa based on the pressure of the low-pressure refrigerant and the target air temperature TAO, in accordance with heating characteristics stored in the control device 30. Here, the heating characteristics show the relationship between the pressure of the low-pressure refrigerant and a heating capacity for obtaining the target air temperature TAO.

Figure 3:
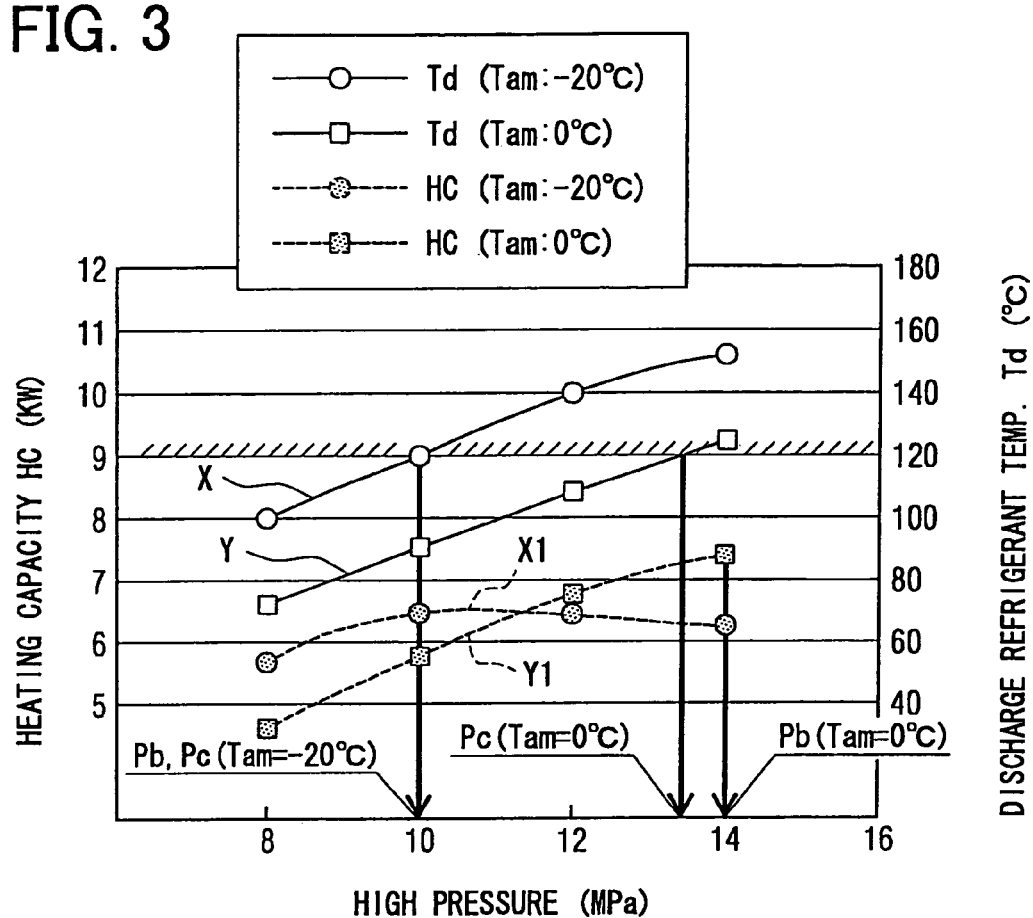
FIG. 3 is a characteristic view showing relationships between a high-pressure refrigerant pressure, a heating capacity HC of an interior heat exchanger and a discharge temperature of refrigerant discharged from a compressor when an outside air temperature is changed as a parameter.

The target control high pressure Pb is a high-pressure refrigerant pressure where the heating capacity of the interior heat exchanger 12 becomes in maximum. The target control high pressure Pb can be calculated based on the characteristic view of FIG. 3. FIG. 3 shows relationships between a heating capacity HC of the interior heat exchanger 12, a high-pressure refrigerant pressure in the interior heat exchanger 12 and a discharge refrigerant temperature Td from the compressor 11. In this embodiment, the high-pressure refrigerant pressure Ph and the discharge refrigerant temperature Td are determined by a low-pressure refrigerant pressure, and the low-pressure refrigerant pressure can be determined based on the outside air temperature Tam.

In FIG. 3, the solid line X shows the relationship between the discharge refrigerant temperature Td and the high-pressure refrigerant pressure when the outside air temperature Tam is −20° C., and the solid line Y shows the relationship between the discharge refrigerant temperature Td and the high-pressure refrigerant pressure when the outside air temperature Tam is 0° C. Furthermore, in FIG. 3, the chain line X1 shows the relationship between the heating capacity HC and the high-pressure refrigerant pressure when the outside air temperature Tam is −20° C., and the chain line Y1 shows the relationship between the heating capacity HC and the high-pressure refrigerant pressure Ph when the outside air temperature Tam is 0° C.

The target control high pressure Pb is a high-pressure refrigerant pressure where the maximum heating capacity of the interior heat exchanger 12 can be obtained relative to the outside air temperature Tam. That is, in the chain line Y1, the high-pressure refrigerant pressure, where the maximum heating capacity of the interior heat exchanger 12 can be obtained, is 14 Mpa when the outside air temperature is 0° C. In contrast, in the chain line X1, the high-pressure refrigerant pressure, where the maximum heating capacity of the interior heat exchanger 12 can be obtained, is 10 Mpa when the outside air temperature is 0° C.

The solid lines X and Y in FIG. 3 can be calculated by a low-pressure refrigerant pressure determined based on the outside air temperature Tam. In this embodiment, a pressure sensor for detecting a low-pressure refrigerant pressure is not provided. As an example, an estimated value of the low-pressure refrigerant pressure can be calculated using an outside air temperature Tam detected by the outside air temperature sensor 21, because the low-pressure refrigerant pressure is a saturated pressure at the outside air temperature Tam.

The target control high pressure Pc is a high-pressure refrigerant pressure where the discharge refrigerant temperature Td can be controlled to be equal to or lower than a permissible discharge refrigerant temperature in the cycle system. For example, when the permissible discharge refrigerant temperature of the compressor 11 is set at 120° C., the target control high pressure Pc is set so that the discharge refrigerant temperature Td becomes equal to or lower than 120° C.

For example, in the solid line Y of FIG. 3, the target control high pressure Pc is 13.6 MPa when the outside air temperature is 0° C. In the solid line X of FIG. 3, the target control high pressure Pc is 10.0 MPa when the outside air temperature is −20° C. Furthermore, the target control high pressure Pd is a high pressure less than a permissible upper limit pressure.

In a heating operation where the compressor 11 having the variable displacement mechanism 11a is used for changing the heating capacity, the target control high pressures Pa, Pb, Pc and Pd may be changed due to variation of the discharge capacity of the compressor 11. As an example, when the outside air temperature Tam is equal to or lower than 0° C., an evaporation pressure of the exterior heat exchanger 14 provided at an exterior is decreased, and a suction refrigerant pressure of the compressor 11 is decreased. In this case, the refrigerant flow amount in the cycle system decreases in the heating operation, as compared with that in the cooling operation. In this condition, if the high-pressure refrigerant pressure increases in order to obtain a high air temperature, a compression ratio of the compressor 11 becomes larger compared with that in a cooling operation.

Furthermore, if the refrigerant discharge capacity is made smaller by using the variable displacement compressor 11, the refrigerant flow amount is decreased and the high-pressure refrigerant pressure is decreased. In this case, if the open degree of the electrical expansion valve 13 is controlled to be smaller in order to keep the high-pressure refrigerant pressure, the refrigerant flow amount is decreased and the refrigerant discharge capacity is changed. Accordingly, one of the high-pressure refrigerant pressure or the refrigerant discharge capacity does not become stable. In this embodiment, even when the refrigerant flow amount is small or the outside air temperature is low, the refrigerant flow amount and the high-pressure refrigerant pressure can be stably controlled.

Specifically, it is determined whether or not a refrigerant flow amount F is higher than a stable limit flow amount Fs at step S390, and it is determined whether or not an outside air temperature Tam is higher than a predetermined temperature Tam1 at step S400.

As an example, a low-pressure refrigerant pressure is estimated based on the outside air temperature, and the refrigerant flow amount is calculated and estimated based on the rotation speed of the compressor 11 and the low-pressure refrigerant pressure. In this case, it is determined whether or not the estimated value of the refrigerant flow amount F is larger than the flow amount Fs. When the estimated value of the refrigerant flow amount F is smaller than the flow amount Fs, the compressor capacity is fixed at 100% without being changed at step 430.

When the estimated value of the refrigerant flow amount F is larger than the flow amount Fs, it is determined whether or not the outside air temperature Tam is equal to or higher than a predetermined temperature Tam1. When the outside air temperature Tam is equal to or lower than the predetermined temperature Tam1, the compressor capacity is fixed at 100% without being changed at step 430. When the outside air temperature Tam is higher than the predetermined temperature Tam1, a target outlet refrigerant temperature Tout after performing a heat exchange in the interior heat exchanger 12 is calculated based on the target control high pressure Ph.

Then, at step 420, the variable displacement mechanism 11a is controlled so that the outlet refrigerant temperature detected by the refrigerant temperature sensor 17 approaches the target outlet refrigerant temperature Tout calculated at step 410. At step 420, the open degree of the electrical expansion valve 13 can be controlled so that the target control high pressure Ph can be obtained, while the capacity of the compressor 11 is changed. In this case, the refrigerant flow amount may be also changed.

Figure 4:
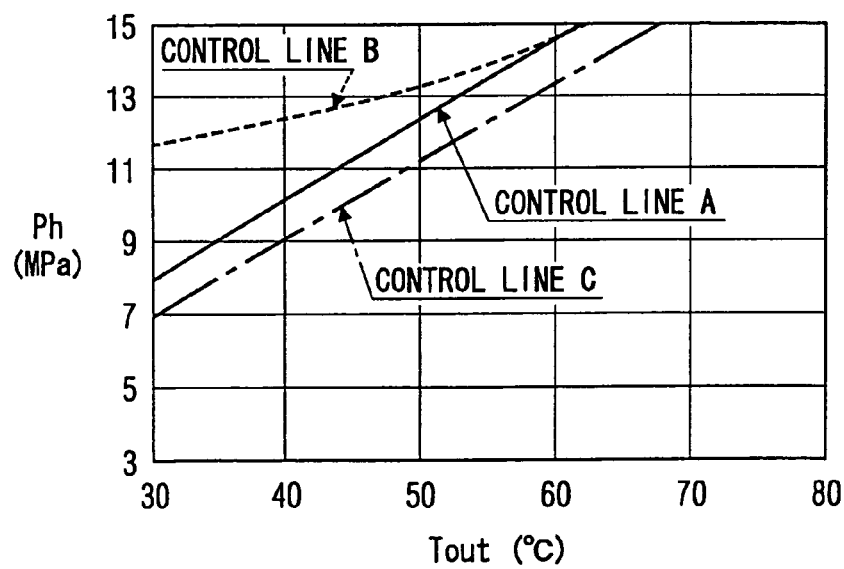
FIG. 4 is a characteristic view showing relationships between a target control high pressure (Ph) of high-pressure refrigerant and a target temperature (Tout) of refrigerant at an outlet of the interior heat exchanger on control lines A, B, C.

In this embodiment, the target outlet refrigerant temperature Tout relative to the target control high pressure Ph can be calculated based on the graphs in FIG. 4.

In FIG. 4, the target outlet refrigerant temperature Tout is set based on any one of the control lines B and C in the heating operation. The control line C is set such that the refrigerant flow amount is changed largely as compared with a change due to the open degree variation after the discharge capacity control of the compressor 11. The control line B is set such that the refrigerant flow amount is changed to be relatively smaller as compared with a change due to the open degree variation after the capacity control of the compressor 11.

Further, as shown in FIG. 4, at the same target control high pressure Ph, the target outlet refrigerant temperature Tout on the control line C is higher than that on the control line B.

When the refrigerant flow amount becomes larger on the control line C, the power consumed in the compressor 11 increases. However, in this case, because an air temperature difference between the inlet and the outlet of the interior heat exchanger 12 is reduced, the air temperature to be blown from the interior heat exchanger 12 can be distributed in a small temperature range. Accordingly, when a temperature difference between an actual air blowing temperature and the target air temperature TAO is larger than a value, the discharge capacity of the compressor 11 is controlled at step 420 so that an actual refrigerant outlet temperature of the interior heat exchanger 12 approaches a target outlet refrigerant temperature Tout that is set based on the target control high pressure Ph using the control line C in FIG. 4.

In this case, a variation in the high-pressure refrigerant pressure, relative to a variation in the open degree of the electrical expansion valve 13, becomes smaller. Therefore, a variation in the air blowing temperature can be made smaller.

In contrast, the control line B is set such that the refrigerant flow amount is changed to be smaller as compared with the change due to the open degree variation after the capacity control of the compressor 11. That is, in the control line B, the open degree of the electrical expansion valve 13 is controlled so that the actual refrigerant outlet temperature approaches the target refrigerant outlet temperature Tout that is set to increase the COP relative to the target control high pressure Ph. For example, the control line B is used when the heating is performed and the air blowing temperature is close to the target air temperature TAO.

In FIG. 4, the control line A shows the relationship between a target refrigerant outlet temperature Tout and a target control high pressure Ph when the cooling operation is performed using the interior heat exchanger 12 as a refrigerant evaporator.

Figure 5:
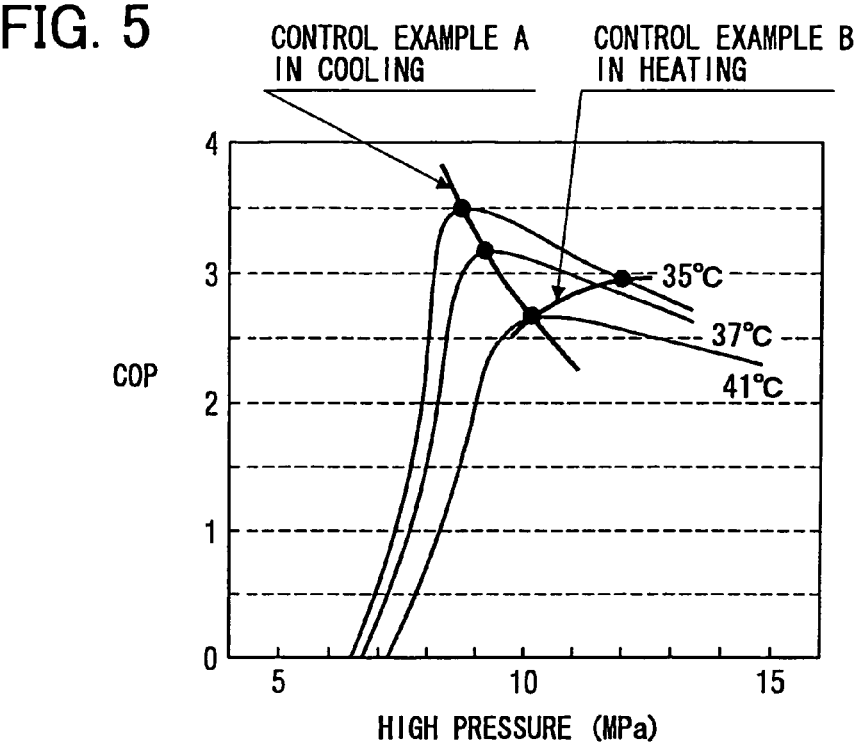
FIG. 5 is a characteristic view showing relationships between a high-pressure refrigerant pressure and coefficient of performance (COP) when a refrigerant temperature at the outlet of a refrigerant radiator is changed.

FIG. 5 shows the relationship between the COP and a high-pressure refrigerant pressure when the refrigerant temperature at the outlet of the interior heat exchanger 12 is changed to 35° C., 37° C. and 41° C. In a control example A, a cooling operation is performed provided that the interior heat exchanger 12 is used as an evaporator and the exterior gas cooler 14 is used as a refrigerant radiator. In the control example A of the cooling operation, the COP can be readily increased within a high-pressure range of 8-10 MPa in an order of the outlet refrigerant temperature. Generally, an exterior heat exchanger can be easily set larger than the interior heat exchanger. Therefore, if the target control pressure is set based on the refrigerant outlet temperature of the exterior heat exchanger (refrigerant radiator) in the cooling operation, the cycle system can be operated with a high COP.

In contrast, in the heating operation, the interior heat exchanger 12 is disposed within a limited space of the dashboard in the passenger compartment, the size of the interior heat exchanger 12 is limited. Accordingly, the refrigerant temperature at the outlet of the interior heat exchanger 12 is largely changed relative to the refrigerant flow amount.

However, in the control example B of the heating operation in FIG. 5, the COP can be increased when the compressor capacity is changed from a first state where the high-pressure refrigerant pressure is 10 MPa, the outlet refrigerant temperature is 41° C. and the discharge capacity of the compressor 11 is 100%, to a second state where the high-pressure refrigerant pressure is 12 MPa, the outlet refrigerant temperature is 35° C. and the discharge capacity of the compressor 11 is 80%. Accordingly, in a case where a temperature difference between the air blowing temperature and the target air temperature TAO is in a predetermined range, the discharge capacity of the compressor 11 is controlled so that the outlet refrigerant temperature of the interior heat exchanger 12 approaches a target outlet refrigerant temperature at which the COP becomes maximum relative to the target control high pressure.

According to this embodiment, the open degree of the electrical expansion valve 13 can be controlled so that the high-pressure refrigerant pressure becomes a target control high pressure Pa. The target control high pressure Pa can be determined based on the pressure of the low-pressure refrigerant and a target air temperature TAO. In this case, even at a low outside air temperature, the target air temperature TAO can be obtained in the heating operation.

Alternatively, the open degree of the electrical expansion valve 13 is controlled so that the high-pressure refrigerant becomes a target control high pressure Pb at which the maximum heating capacity can be obtained in the heating operation. Accordingly, even when a temperature difference between the air temperature flowing into the interior heat exchanger 12 and the target air temperature TAO to be heated by the interior heat exchanger 12 is larger, the air passing through the interior heat exchanger 12 can be quickly heated using the interior heat exchanger 12. Furthermore, even when the heating capacity of the heat pump cycle system is small relative to the target air temperature TAO blown from the interior heat exchanger 12, the heating capacity can be increased in maximum while the high-pressure refrigerant pressure is prevented from being excessively increased.

When the actual air blowing temperature approaches the target air temperature TAO, that is, when a temperature difference between the actual air blowing temperature and the target air temperature TAO becomes smaller than a value, the open degree of the electrical expansion valve 13 can be set larger. In this case, the target control high pressure Ph becomes lower, and a temperature difference between the target outlet refrigerant temperature Tout and an actual outlet refrigerant temperature after performing heat exchange in the interior heat exchanger 12 becomes smaller. However, because the compressor capacity is controlled along the control line B of FIG. 4, the COP can be relatively increased in the cycle system.

According to this embodiment, as the target control high pressure Pa, a high-pressure refrigerant pressure is calculated such that the air temperature after heat-exchanged in the interior heat exchanger 12 in the heating operation becomes the target air temperature TAO. Then, the open degree of the electrical expansion valve 13 is controlled so that the pressure of refrigerant in the interior heat exchanger 12 approaches the target control high pressure Pa. In this case, the air temperature heated by the interior heat exchanger 12 can be rapidly approached to the target air temperature TAO.

In this embodiment, a relationship between the pressure of the low-pressure refrigerant and a heating capacity for obtaining the target air temperature can be stored in a memory unit of the control device 30, and the target control high pressure Ph can be determined using the relationship.

As the target control high pressure Pb, a high-pressure refrigerant pressure is calculated so that the maximum heating capacity can be obtained in the interior heat exchanger 12 in accordance with the low-pressure refrigerant pressure. Then, the open degree of the electrical expansion valve 13 is controlled so that the pressure of refrigerant in the interior heat exchanger 12 approaches the target control high pressure Pb. In this case, the heating capacity of the interior heat exchanger 12 can be effectively improved.

Alternatively, a smaller one among the target control high pressures Pa, Pb can be used as the high-pressure refrigerant pressure, and the open degree of the electrical expansion valve 13 is controlled so that the pressure of refrigerant in the interior heat exchanger 12 approaches the smaller one between the target control high pressures Pa, Pb. In this case, the heating capacity of the interior heat exchanger 12 can be more effectively improved.

The upper limit of each target control high pressure Pa, Pb is restricted so that the discharge refrigerant temperature of the compressor 11 becomes lower than the permit discharge refrigerant temperature of the compressor 11. Accordingly, the compressor 11 can be normally operated while being protected.

Further, in a case where a variable displacement compressor is used as the compressor 11, when the discharge capacity of the compressor 11 is controlled, there is a case where an actual outlet refrigerant temperature of the interior heat exchanger 12 does not reach the target outlet refrigerant temperature Tout that is set based on the pressure in the interior heat exchanger 12. In this case, the refrigerant discharge capacity of the compressor 11 is maintained at 100%.

If the air blowing temperature of the interior heat exchanger 12 approaches the target air temperature TAO and the heating load of the interior heat exchanger 12 becomes small, the discharge capacity of the compressor 11 is reduced, so that the target outlet refrigerant temperature decreases in accordance with the target control high pressure and the COP is increased. Therefore, it is possible to continuously increase the COP when the air blowing temperature of the interior heat exchanger 12 approaches the target air temperature.

When the refrigerant flow amount flowing through the interior heat exchanger 12 is lower than a predetermined value, the refrigerant discharge capacity of the compressor 11 is set at 100%, so that it can prevent the high-pressure refrigerant pressure from being greatly changed. Furthermore, when the outside air temperature is lower than a predetermined low temperature, the refrigerant discharge capacity of the compressor 11 is set at 100%.

For example, the refrigerant flow amount can be calculated based on the suction refrigerant temperature of the compressor 11 and the rotation speed of the compressor 11. Furthermore, because the suction refrigerant temperature of the compressor 11 is related to the outside air temperature, the refrigerant flow amount can be calculated based on the outside air temperature and the rotation speed of the compressor 11.

In this embodiment, a pressure sensor for detecting a low-pressure refrigerant pressure is not provided, and the low-pressure refrigerant pressure is estimated based on the outside air temperature. Accordingly, the target control high pressure Ph can be calculated by estimating the low-pressure refrigerant pressure based on the detected outside air temperature.

Second Exemplary Embodiment

In the above-described first embodiment, the Interior heat exchanger 12 is used as a refrigerant radiator for heating a fluid (e.g., air) during a heating operation, in the supercritical refrigerant cycle system. In the second embodiment, the present invention is applied to a supercritical refrigerant cycle system where a cooling operation and a heating operation can be selectively switched.

Figure 6A:
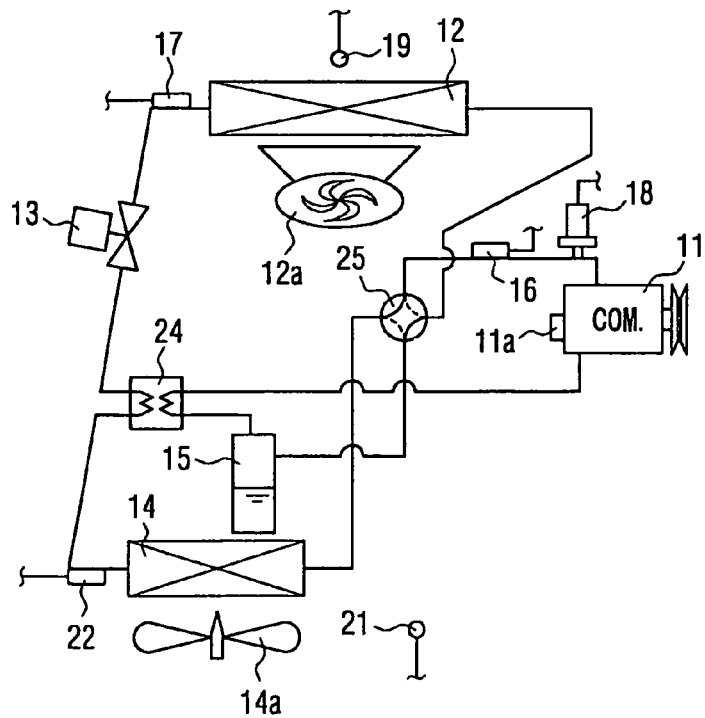
FIG. 6A is a schematic diagram showing a supercritical heat pump cycle system in a cooling operation according to a second exemplary embodiment of the present invention.
Figure 6B:
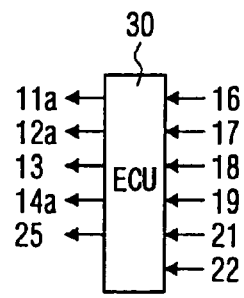
FIG. 6B is a block diagram showing a control device of the supercritical heat pump cycle system in FIG. 6A.
Figure 7:
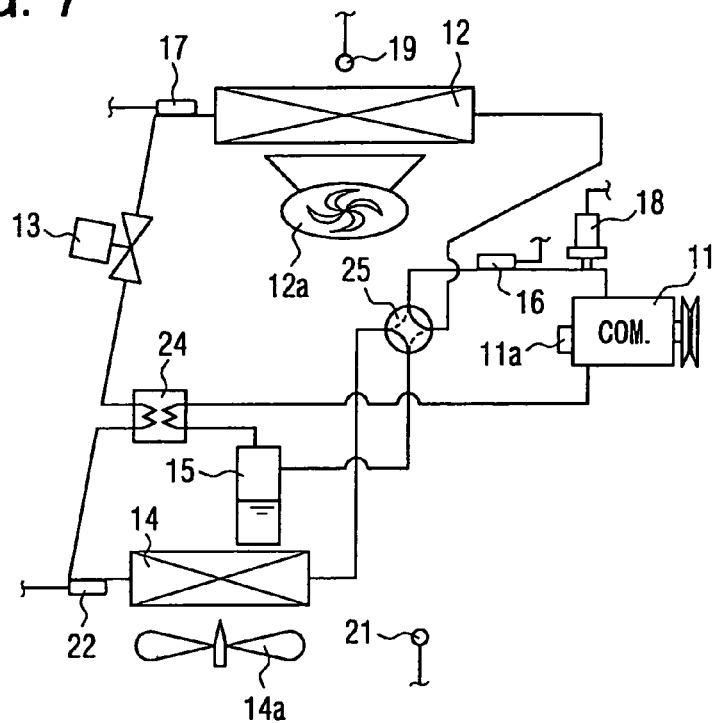
FIG. 7 is a schematic diagram showing a supercritical heat pump cycle system in a heating operation according to the second exemplary embodiment.

FIG. 6A shows the cooling operation of the cycle system, and FIG. 7 shows the heating operation of the cycle system. In this embodiment, a switching valve 25 for switching between a refrigerant suction side and a refrigerant discharge side of the compressor 11 is provided, and a refrigerant temperature sensor 22 for detecting a refrigerant temperature at an outlet of the interior heat exchanger 14 is provided. In the cooling operation, high-pressure refrigerant flows into the exterior heat exchanger 14.

Furthermore, an inner heat exchanger 24 is provided. In the cooling operation, gas refrigerant to be sucked to the compressor 11 and high-pressure refrigerant radiated in the exterior heat exchanger 14 are heat-exchanged. In this embodiment, a pressure sensor 18 is provided at a discharge side of the compressor 11 to detect high-pressure refrigerant pressure in both the cooling operation and the heating operation.

In the cooling operation, high-pressure high-temperature refrigerant discharged from the compressor 11 flows into the exterior heat exchanger 14, and is radiated in the exterior heat exchanger 14. The heat-pressure refrigerant from the exterior heat exchanger 14 is heat-exchanged with low-pressure refrigerant in the inner heat exchanger 24, and is decompressed in the electrical expansion valve 13. Low-pressure and low-temperature refrigerant is evaporated in an interior heat exchanger 12 so that a fluid such as air is cooled in the interior heat exchanger 12. The refrigerant from the interior heat exchanger 12 is supplied to a suction side of the compressor 11 through the accumulator 15 and a low-pressure passage in the inner heat exchanger 24.

In the cooling operation, the open degree of the electrical expansion valve 13 is controlled so that the outlet refrigerant temperature detected by the refrigerant temperature sensor 22 approaches a target control high pressure at which the COP becomes in maximum. In addition, the discharge capacity of the compressor 11 is controlled so that the air temperature detected by the air temperature sensor 19 becomes a target air temperature TAO.

In contrast, in the heating operation, high-pressure high temperature refrigerant discharged from the compressor 11 flows into the interior heat exchanger 12 (refrigerant radiator), and is decompressed in the electrical expansion valve 13. Then, the refrigerant from the electrical expansion valve 13 flows to the exterior heat exchanger 14 to be evaporated, and is supplied to the suction side of the compressor 11 through the accumulator 15 and the low-pressure refrigerant passage of the inner heat exchanger 24. In the heating operation, although the refrigerant decompressed in the electrical expansion valve 13 is heat-exchanged with gas refrigerant to be sucked to the compressor 11 within the inner heat exchanger 24, heat-exchanging function in the inner heat exchanger 24 is small in the heating operation.

The heating operation may be controlled similarly to the control process shown in FIG. 2. In this embodiment, because the refrigerant temperature sensor 22 is provided, the pressure of low-pressure refrigerant sucked to the compressor 11 can be accurately determined in the heating operation. In this case, it is unnecessary to estimate the pressure of the low-pressure refrigerant based on the outside air temperature.

Other Exemplary Embodiments

Although the present invention has been described in connection with some exemplary embodiments thereof with reference to the accompanying drawings, it is to be noted that various changes and modifications will become apparent to those skilled in the art.

Figure 8A:
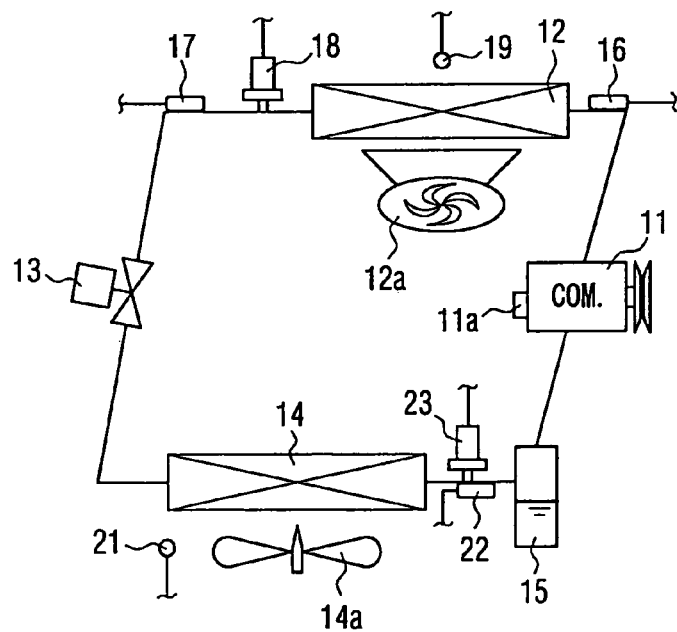
FIG. 8A is a schematic diagram showing a supercritical heat pump cycle system according to another exemplary embodiment of the present invention.
Figure 8B:
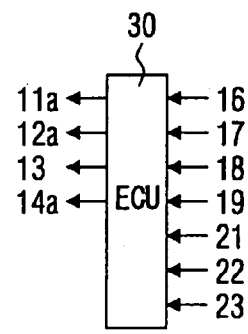
FIG. 8B is a block diagram showing a control device of the supercritical heat pump cycle system in FIG. 8A.

For example, in the above-described first embodiment, the low-pressure refrigerant pressure is estimated from the outside air temperature. However, a refrigerant temperature sensor 22 for detecting a refrigerant temperature at the refrigerant outlet of the exterior heat exchanger 14 may de provided as shown in FIGS. 8A and 8B. In this case, the low-pressure refrigerant pressure can be accurately calculated based on the refrigerant temperature detected by the refrigerant temperature sensor 22. Further, as shown in FIGS. 8A, 8B, a pressure sensor 23 for detecting the pressure of the low-pressure refrigerant may be provided. In this case, the pressure of the low-pressure refrigerant can be more accurately detected.

In the above-described embodiments, at step 420, the variable displacement mechanism 11a is controlled so that the refrigerant temperature detected by the refrigerant temperature sensor 17 becomes the target outlet refrigerant temperature Tout. However, at step 420, the variable displacement mechanism 11a may be controlled so that the air temperature flowing from the interior heat exchanger 12 and the refrigerant temperature at the outlet of the interior heat exchanger 12 becomes a target temperature difference.

In the heating operation, the control lines B, C in FIG. 4 are used. However, the other control line such as the control line A in the cooling operation may be used. Further, an electrical compressor where the refrigerant discharge capacity can be changed by an inverter control may be used instead of the compressor 11.

Further, in the above-described embodiments, the interior heat exchanger 12 of the supercritical heat pump cycle system is used for a vehicle air conditioner. However, the interior heat exchanger 12 may be used for performing a heat exchange with a fluid in a device.

While the invention has been described with reference to exemplary embodiments thereof, it is to be understood that the invention is not limited to the above-described embodiments and constructions. The invention is intended to cover various modification and equivalent arrangements. In addition, while the various elements of the embodiments are shown in various combinations and configurations, which are exemplary, other combinations and configuration, including more, less or only a single element, are also within the spirit and scope of the invention.

What is claimed is:

1. A supercritical heat pump cycle system comprising:
    a compressor for compressing refrigerant;
    a refrigerant radiator having an inner pressure higher than a critical pressure of the refrigerant, in which the refrigerant discharged from the compressor is heat-exchanged with a fluid passing the refrigerant radiator to heat the fluid in a heating operation;
    a decompression unit which decompresses the refrigerant flowing from the refrigerant radiator;
    a refrigerant evaporator for evaporating the refrigerant from the decompression unit;
    target temperature setting means for setting a target temperature of the fluid;
    target pressure determining means for determining a heating target control pressure in the refrigerant radiator based on the target temperature of the fluid, during the heating operation, and
    low-pressure determining means for determining a pressure of a low-pressure refrigerant after being decompressed in the decompression unit, wherein
    the decompression unit is controlled so that a refrigerant pressure in the refrigerant radiator becomes the target control pressure; and
    the pressure determining means determines the heating target control pressure in the refrigerant radiator based on the pressure of the low-pressure refrigerant and the target temperature of the fluid, during the heating operation.

2. The supercritical heat pump cycle system according to claim 1, wherein the target pressure determining means includes memory means for memorizing a relationship between the pressure of the low-pressure refrigerant and a heating capacity for obtaining the target temperature of the fluid, and determines the heating target control pressure using the relationship.

3. The supercritical heat pump cycle system according to claim 1, further comprising
    a switching unit for switching between the heating operation and a cooling operation for cooling a fluid, wherein:
    the target pressure determining means determines a cooling target control pressure where coefficient of performance (COP) becomes in maximum, in the cooling operation; and
    the target pressure determining means determines the heating target control pressure based on the pressure of the low-pressure refrigerant and the target temperature.

4. The supercritical heat pump cycle system according to claim 1, wherein:
    the compressor is a variable displacement compressor in which a discharge capacity of the refrigerant is variable; and
    the discharge capacity of refrigerant discharged from the compressor is controlled such that a temperature difference between a temperature of the fluid heat-exchanged in the refrigerant radiator and a refrigerant temperature at a refrigerant outlet of the refrigerant radiator approaches a target temperature difference.

5. The supercritical heat pump cycle system according to claim 1, wherein:
    the compressor is a variable displacement compressor in which a discharge capacity of the refrigerant is variable; and
    the discharge capacity of refrigerant discharged from the compressor is controlled such that a refrigerant temperature at a refrigerant outlet of the refrigerant radiator becomes a target refrigerant temperature at which coefficient of performance of the cycle system becomes in maximum relative to the inner pressure of the refrigerant radiator.

6. The supercritical heat pump cycle system according to claim 1, wherein:
    the compressor is a variable displacement compressor in which a discharge capacity of the refrigerant is variable; and
    the discharge capacity of refrigerant discharged from the compressor is controlled such that a refrigerant temperature at a refrigerant outlet of the refrigerant radiator becomes a target refrigerant temperature that is set relative to the inner pressure of the refrigerant radiator.

7. The supercritical heat pump cycle system according to claim 1, wherein:
    the refrigerant evaporator performs a heat exchange between the low-pressure refrigerant and outside air in the heating operation; and
    the pressure of the low-pressure refrigerant is determined based on temperature of outside air.

8. The supercritical heat pump cycle system according to claim 7, further comprising
    an outside air temperature detecting unit which detects the temperature of outside air.

9. The supercritical heat pump cycle system according to claim 1, further comprising:
    a refrigerant temperature detecting unit which detects a refrigerant temperature at one of a refrigerant inlet and a refrigerant outlet of the refrigerant evaporator, wherein the pressure of the low-pressure refrigerant is determined based on the detected refrigerant temperature.

10. The supercritical heat pump cycle system according to clam 1, further comprising
a refrigerant pressure detecting unit which detects the pressure of the low-pressure refrigerant.

11. A supercritical heat pump cycle system comprising:
a compressor for compressing refrigerant;
a refrigerant radiator having an inner pressure higher than a critical pressure of the refrigerant, in which the refrigerant discharged from the compressor is heat-exchanged with a fluid passing the refrigerant radiator to heat the fluid in a heating operation;
a decompression unit which decompresses the refrigerant flowing from the refrigerant radiator;
a refrigerant evaporator for evaporating the refrigerant from the decompression unit;
target temperature setting means for setting a target temperature of the fluid;
target pressure determining means for determining a heating target control pressure in the refrigerant radiator based on the target temperature of the fluid, during the heating operation, wherein
the decompression unit is controlled so that a refrigerant pressure in the refrigerant radiator becomes the target control pressure; and
the target pressure determining means calculates the heating target control pressure to have an upper limit at which the refrigerant radiator has a maximum heating capacity.

12. A supercritical heat pump cycle system comprising:
a compressor for compressing refrigerant;
a refrigerant radiator having an inner pressure higher than a critical pressure of the refrigerant, in which the refrigerant discharged from the compressor is heat-exchanged with a fluid passing the refrigerant radiator to heat the fluid in a heating operation;
a decompression unit which decompresses the refrigerant flowing from the refrigerant radiator;
a refrigerant evaporator for evaporating the refrigerant from the decompression unit;
target temperature setting means for setting a target temperature of the fluid;
target pressure determining means for determining a heating target control pressure in the refrigerant radiator based on the target temperature of the fluid, during the heating operation, wherein
the decompression unit is controlled so that a refrigerant pressure in the refrigerant radiator becomes the target control pressure; and
the target pressure determining means calculates the heating target control pressure to have an upper limit at which a refrigerant temperature of the compressor becomes lower than a permit discharge temperature of the compressor.

13. A supercritical heat pump cycle system comprising:
a compressor for compressing refrigerant;
a refrigerant radiator having an inner pressure higher than a critical pressure of the refrigerant, in which the refrigerant discharged from the compressor is heat-exchanged with a fluid passing the refrigerant radiator to heat the fluid in a heating operation;
a decompression unit which decompresses the refrigerant flowing from the refrigerant radiator;
a refrigerant evaporator for evaporating the refrigerant from the decompression unit;
target temperature setting means for setting a target temperature of the fluid;
target pressure determining means for determining a heating target control pressure in the refrigerant radiator based on the target temperature of the fluid, during the heating operation, wherein
the decompression unit is controlled so that a refrigerant pressure in the refrigerant radiator becomes the target control pressure;
the compressor is a variable displacement compressor in which a discharge capacity of the refrigerant is variable; and
the discharge capacity of refrigerant discharged from the compressor is set at 100% when a flow amount of the refrigerant flowing in the refrigerant radiator is smaller than a value.

14. The supercritical heat pump cycle system according to claim 13, wherein the flow amount of the refrigerant flowing in the refrigerant radiator is estimated based on a temperature of outside air and a rotation speed of the compressor.

15. A supercritical heat pump cycle system comprising:
a compressor for compressing refrigerant;
a refrigerant radiator having an inner pressure higher than a critical pressure of the refrigerant, in which the refrigerant discharged from the compressor is heat-exchanged with a fluid passing the refrigerant radiator to heat the fluid in a heating operation;
a decompression unit which decompresses the refrigerant flowing from the refrigerant radiator;
a refrigerant evaporator for evaporating the refrigerant from the decompression unit;
first calculation means for calculating a first target control pressure that is a pressure of the high-pressure refrigerant before being decompressed, at which a temperature of the fluid heat-exchanged with the refrigerant in the refrigerant radiator approaches a target temperature; and
second calculation means for calculating a second target control pressure that is a pressure of the high-pressure refrigerant before being decompressed by the decompression unit, at which the refrigerant radiator has a maximum heating capacity in accordance with a pressure of low-pressure refrigerant after being decompressed by the decompression unit,
wherein an open degree of the decompression unit is controlled so that a refrigerant pressure in the refrigerant radiator becomes a smaller one between the first and second target control pressures.

16. The supercritical heat pump cycle system according to claim 15, wherein the first and second calculating means calculate the first and second target control pressures to have an upper limit at which the refrigerant radiator has a maximum heating capacity.

17. The supercritical heat pump cycle system according to claim 15, wherein the first and second calculating means calculate the first and second target control pressures to have an upper limit, at which a refrigerant temperature of the compressor becomes lower than a permit discharge temperature of the compressor.

18. The supercritical heat pump cycle system according to claim 15, further comprising
a gas-liquid separator in which the refrigerant from the refrigerant evaporator is separated into gas refrigerant and liquid refrigerant, wherein the gas-liquid separator is connected to a suction side of the compressor.

* * * * *